US009671498B2

(12) United States Patent
Shingyoji (10) Patent No.: US 9,671,498 B2
(45) Date of Patent: Jun. 6, 2017

(54) GPS RECEIVING APPARATUS AND COMPUTER READABLE-STORAGE MEDIUM

(71) Applicant: CASIO COMPUTER CO., LTD., Shibuya-ku, Tokyo (JP)

(72) Inventor: Ryuji Shingyoji, Ome (JP)

(73) Assignee: CASIO COMPUTER CO., LTD., Tokyo (JP)

(*) Notice: Subject to any disclaimer, the term of this patent is extended or adjusted under 35 U.S.C. 154(b) by 589 days.

(21) Appl. No.: 14/195,584

(22) Filed: Mar. 3, 2014

(65) Prior Publication Data
US 2014/0266879 A1 Sep. 18, 2014

(30) Foreign Application Priority Data
Mar. 18, 2013 (JP) ................................ 2013-054534

(51) Int. Cl.
*G01S 19/26* (2010.01)
(52) U.S. Cl.
CPC .................................... *G01S 19/26* (2013.01)
(58) Field of Classification Search
CPC .......... G01S 19/25; G01S 19/26; G01S 19/27; G01C 21/10; G01C 21/12; G01C 21/14; G01C 21/16
See application file for complete search history.

(56) References Cited

U.S. PATENT DOCUMENTS

| 6,427,120 B1* | 7/2002 | Garin | G01S 5/0009 342/357.64 |
|---|---|---|---|
| 8,188,916 B2* | 5/2012 | Shingyoji | G01S 19/24 342/357.63 |

(Continued)

FOREIGN PATENT DOCUMENTS

| CN | 101676738 A | 3/2010 |
|---|---|---|
| JP | 06188826 A | 7/1994 |

(Continued)

OTHER PUBLICATIONS

Chinese Office Action (and English translation thereof) dated Jul. 26, 2016, issued in counterpart Chinese Application No. 2014100993527.

(Continued)

*Primary Examiner* — Frank J McGue
*Assistant Examiner* — Daniel P Malley, Sr.
(74) *Attorney, Agent, or Firm* — Holtz, Holtz & Volek PC (57) ABSTRACT

A GPS receiving apparatus and a computer readable storage medium are described. According to one implementation, the GPS receiving apparatus includes a GPS receiving unit, a storage unit, a position measuring unit, a reception control unit, and a movement judging unit. The storage unit stores GPS information. The reception control unit starts reception operation with a first or second mode. In the first mode, the GPS receiving unit uses the stored GPS information. In the second mode, the stored GPS information is not used. The movement judging unit judges whether the apparatus is moved a predetermined distance or more from a previous measured position. When the movement judging unit judges that the apparatus is moved the predetermined distance or more, the reception control unit starts reception operation with the second mode.

8 Claims, 6 Drawing Sheets

(56) References Cited

U.S. PATENT DOCUMENTS

| | | | |
|---|---|---|---|
| 2004/0068367 A1* | 4/2004 | Mitsunaga | G01C 21/165 701/472 |
| 2009/0167603 A1* | 7/2009 | Muraguchi | G01S 19/22 342/357.55 |
| 2010/0066602 A1 | 3/2010 | Kim | |
| 2010/0073227 A1* | 3/2010 | Waters | G01S 19/235 342/357.48 |
| 2010/0149035 A1* | 6/2010 | Cook | G01S 19/26 342/357.63 |
| 2010/0267375 A1* | 10/2010 | Lemmon | G06F 21/74 455/418 |
| 2012/0059623 A1* | 3/2012 | Sambongi | G01C 21/005 702/150 |
| 2012/0290252 A1* | 11/2012 | Abraham | G01C 21/10 702/141 |

FOREIGN PATENT DOCUMENTS

| | | |
|---|---|---|
| JP | 2003-344523 A | 12/2003 |
| JP | 2007085878 A | 4/2007 |

OTHER PUBLICATIONS

Japanese Office Action (and English translation thereof) dated Jan. 10, 2017 issued in corresponding Japanese Application No. 2013-054534.

\* cited by examiner

FIG.6

GPS RECEIVING APPARATUS AND COMPUTER READABLE-STORAGE MEDIUM

CROSS-REFERENCE TO RELATED APPLICATION

This application is based upon and claims the benefit of priority from prior Japanese Patent Application No. 2013-054534, filed Mar. 18, 2013, the entire contents of which are incorporated herein by reference.

BACKGROUND OF THE INVENTION

Field of the Invention

The present invention relates to a GPS receiving apparatus and a computer readable storage medium.

Description of the Related Art

Lately, techniques to measure a position using a GPS (Global Positioning System) have been developed. The GPS receiving apparatus receives a signal transmitted from a plurality of GPS satellites and obtains GPS information regarding the GPS satellite from the received signal. Then, the GPS receiving apparatus calculates the distance to each GPS satellite based on the GPS information to measure the position of the apparatus. The GPS receiving apparatus is included in a vehicle navigation system, portable phone, camera and the like.

If the GPS receiving apparatus is being used for the first time or has not been used for a long period of time, when the power of the apparatus is turned on, all of the GPS satellites are set as targets to make an attempt to sequentially receive signals from the satellites. A signal from the GPS satellite used in measuring the position is received and the position is measured (cold start). When the power is turned on after the GPS receiving apparatus has executed a reception operation, the GPS receiving apparatus uses the satellite position from the previous measured position (last GPS information) to perform GPS reception operation (hot start, warm start).

For example, a GPS receiving apparatus has been proposed that is started with the hot start mode when the information regarding the GPS satellite is stored in the backup memory, and that is started with the cold start mode when the information regarding the GPS satellite is not stored in the backup memory (see, for example, Japanese Patent Application Laid-Open Publication No. 2003-344523).

However, when the above-described GPS receiving apparatus measures a position that is far from a position which was previously measured, the layout (relative position) of the satellites with respect to the GPS receiving apparatus is greatly different than at the previous measured position. Therefore, even if an attempt is made to start the apparatus with the hot start mode or the warm start mode, there are cases where the calculation used to measure the position does not end. In this case, the apparatus is restarted with the cold start mode after a predetermined time limit passes. Therefore, there is a problem with the above-described GPS receiving apparatus whereby when the apparatus has moved a distance equal to or more than a predetermined distance from the previous measured position and an attempt is made to start the apparatus with the hot start mode or the warm start mode, the measuring time becomes longer than if the apparatus were started with the cold start mode from the beginning.

BRIEF SUMMARY OF THE INVENTION

The present invention has been made in view of the above problems, and it is one of the main objects to reduce a measuring time when an apparatus measures a position far from a previous measured position, in which case it is not possible to start the apparatus with the hot start mode or the warm start mode.

According to an aspect of the present invention, there is provided a GPS receiving apparatus including:

a GPS receiving unit which receives a GPS signal and obtains GPS information from the received signal;

a storage unit which stores the GPS information obtained by the GPS receiving unit;

a position measuring unit which measures a position based on the GPS information obtained by the GPS receiving unit;

a reception control unit which starts reception operation with either a first mode or a second mode, the first mode in which a GPS signal is received by the GPS receiving unit using the GPS information stored in the storage unit, and the second mode in which a GPS signal is received without using the GPS information stored in the storage unit; and a movement judging unit which judges whether the GPS receiving apparatus is moved a predetermined distance or more from a previous measured position, wherein when the movement judging unit judges that the GPS receiving apparatus is moved the predetermined distance or more from the previous measured position, the reception control unit starts reception operation with the second mode.

According to another aspect of the present invention, there is provided a non-transitory computer-readable storage medium having a program stored thereon for controlling a computer used in a GPS receiving apparatus including a GPS receiving unit which receives a GPS signal and obtains GPS information from the received signal and a storage control unit which stores the GPS information obtained by the GPS receiving unit in a storage unit, wherein the program controls the computer to function as:

a position measuring unit which measures a position based on the GPS information obtained by the GPS receiving unit;

a reception control unit which starts reception operation with either a first mode or a second mode, the first mode in which a GPS signal is received by the GPS receiving unit using the GPS information stored in the storage unit, and the second mode in which a GPS signal is received without using the GPS information stored in the storage unit; and a movement judging unit which judges whether the GPS receiving apparatus is moved a predetermined distance or more from a previous measured position, wherein when the movement judging unit judges that the GPS receiving apparatus is moved the predetermined distance or more from the previous measured position, the reception control unit starts reception operation with the second mode.

BRIEF DESCRIPTION OF THE SEVERAL VIEWS OF THE DRAWING

The present invention and the above-described objects, features and advantages thereof will become more fully understood from the following detailed description with the accompanying drawings and wherein.

DETAILED DESCRIPTION OF THE INVENTION

Below, an embodiment of a GPS receiving apparatus of the present invention is described with reference to the drawings. The present invention is not limited to the illustrated examples.

Figure 1:
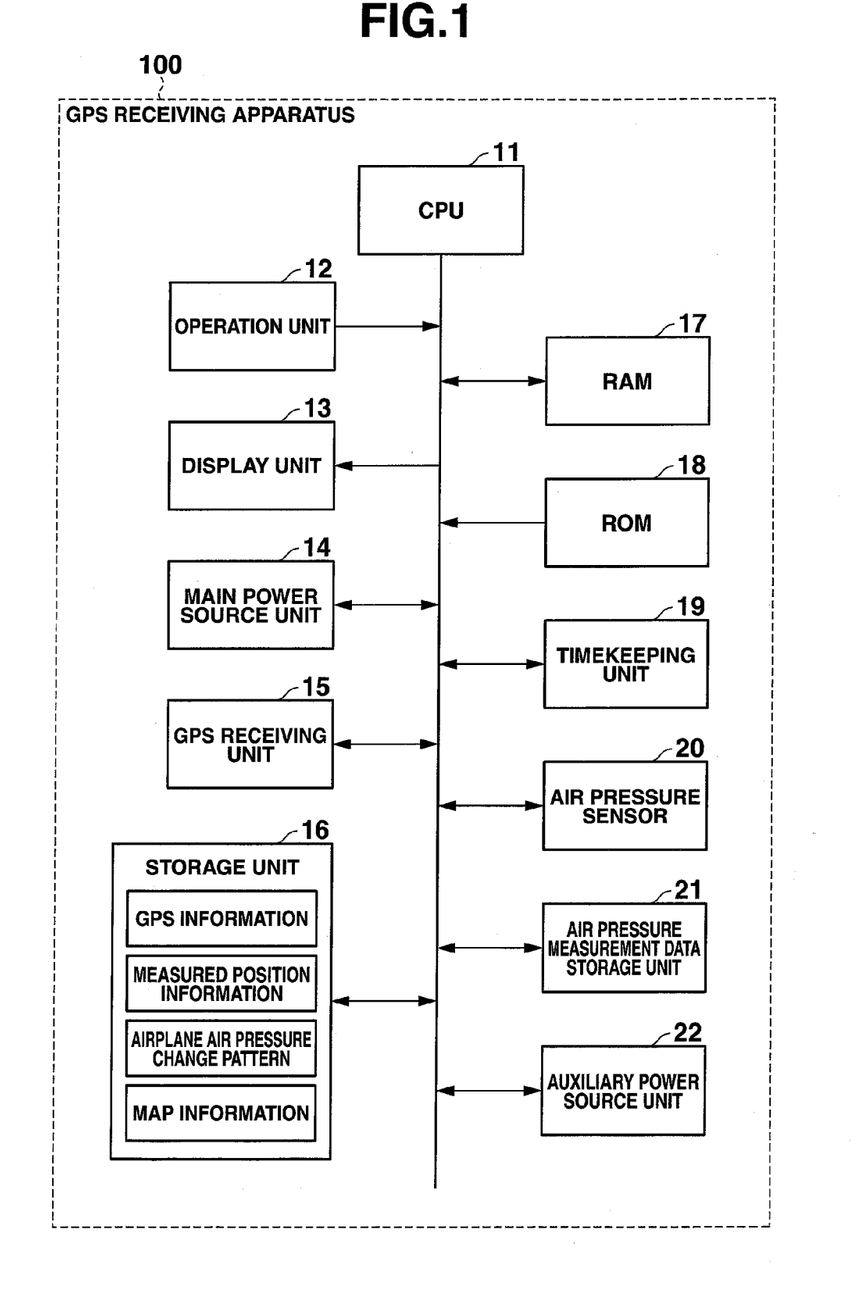
FIG. 1 is a block diagram showing a functional configuration of a GPS receiving apparatus of the present invention.

FIG. 1 is a block diagram showing a functional configuration of the GPS receiving apparatus 100.

The GPS receiving apparatus 100 includes a CPU (Central Processing Unit) 11 as a position measuring unit, a reception control unit, and a movement judging unit, an operation unit 12, a display unit 13, a main power source unit 14, a GPS receiving unit 15, a storage unit 16, a RAM (Random Access Memory) 17, a ROM (Read Only Memory) 18, a timekeeping unit 19, an air pressure sensor 20, an air pressure measurement data storage unit 21, and an auxiliary power source unit 22. The GPS receiving apparatus 100 is included in a portable terminal or the like.

The CPU 11 centrally controls the processing operation of each unit of the GPS receiving apparatus 100. Specifically, the CPU 11 reads out various processing programs stored in the ROM 18 to the RAM 17 and executes the programs to perform various processing in coordination with the programs.

The operation unit 12 includes various buttons to receive an input operation by the user, and outputs operation signals to the CPU 11 based on the user operation. The operation unit 12 can include a touch panel provided on a display screen of the display unit 13 so that the touch panel can detect the position touched by the user's finger, etc., to output the operation signals to the CPU 11 according to the position.

The display unit 13 includes an LCD (Liquid Crystal Display), etc., and displays a screen according to a display control signal from the CPU 11. For example, the display unit 13 displays GPS reception status or a present position on a map.

The main power source unit 14 is a secondary battery such as a lithium battery or a primary battery such as an alkaline battery, and supplies electric power to each unit of the GPS receiving apparatus 100 such as the CPU 11.

The GPS receiving unit 15 acquires and receives signals transmitted from a plurality of GPS satellites and obtains GPS information regarding the GPS satellite from the received signals. Specifically, the GPS receiving unit 15 includes an antenna to receive radio waves from the GPS satellite. The GPS receiving unit 15 demodulates the radio waves received from the antenna to output demodulated GPS information to the CPU 11.

The GPS information includes almanac data and ephemeris data. The almanac data includes orbit information regarding all GPS satellites on an orbit. The ephemeris data includes position information showing the accurate position of each GPS satellite and time information showing the time that the radio wave thereof is emitted. Both the almanac data and the ephemeris data have a term (period) of validity within which the data are still valid for use in GPS measurement.

The storage unit 16 has a nonvolatile memory, and stores information in a readable and writable manner.

Specifically, the storage unit 16 stores GPS information obtained by the GPS receiving unit 15 and measured position information calculated based on the GPS information.

As the GPS information, the almanac data and the ephemeris data obtained in a previous GPS position measurement are stored in the storage unit 16.

The measured position information is information showing a position of the GPS receiving apparatus 100 obtained by GPS position measurement. The measured position information includes latitude, longitude, altitude, and the like. Moreover, the measured position information can be stored in the storage unit 16 in association with time information output from the timekeeping unit 19, and movement path data can be stored according to time.

An airplane air pressure change pattern showing a pattern of air pressure change in a moving airplane and map information for displaying a present position are stored in advance in the storage unit 16.

The airplane air pressure change pattern is information showing characteristics of a change of air pressure in an airplane while moving, and is prepared in advance (i.e., the airplane air pressure change pattern is a predetermined pattern stored, for example, in the storage unit 16).

The RAM 17 is a volatile memory. The RAM 17 stores various programs which are executed and data regarding such programs.

The ROM 18 is a read only semiconductor memory which stores various programs and various pieces of data. Programs such as the GPS reception processing program are stored in the ROM 18.

The timekeeping unit 19 includes a timekeeping circuit, and outputs present time information measured by the timekeeping circuit to the CPU 11.

The air pressure sensor 20 measures the air pressure in an environment where the GPS receiving apparatus 100 is located, at predetermined intervals, and outputs the measured values of the air pressure.

The air pressure measurement data storage unit 21 includes a nonvolatile memory, etc., and stores timeline data of air pressure measured by the air pressure sensor 20 (hereinafter referred to as air pressure measurement data). The air pressure measurement data is data of the measured value of the air pressure output from the air pressure sensor 20, which value is associated with the time information output from the timekeeping unit 19 when the value is measured to record the value according to time.

The auxiliary power source unit 22 includes a battery, etc., and supplies electric power to the timekeeping unit 19, the air pressure sensor 20, and the air pressure measurement data storage unit 21 when the power source (main power source unit 14) of the GPS receiving apparatus 100 is turned off, in other words, when the supply of electric power from the main power source unit 14 to each unit of the GPS receiving apparatus 100 stops. The timekeeping unit 19, the air pressure sensor 20, and the air pressure measurement data storage unit 21 are supplied with electric power from the main power source unit 14 when the power of the GPS receiving apparatus 100 is on and electric power from the auxiliary power source unit 22 when the power of the GPS receiving apparatus 100 is turned off. Since the electric current used by the air pressure sensor 20 is small (a few µA for measurement each second), successive measurement is possible without greatly influencing the battery life of the auxiliary power source unit 22.

The CPU 11 measures the position of the apparatus (GPS receiving apparatus 100) based on the GPS information obtained by the GPS receiving unit 15. Based on the GPS information obtained by the GPS receiving unit 15, the CPU 11 calculates the present position (latitude, longitude, altitude) of the GPS receiving apparatus 100 and outputs the measured position information of the position.

Specifically, the CPU 11 predicts the GPS satellite which can be used for measuring the position based on the almanac data. The CPU 11 obtains the accurate time information from the ephemeris data and adjusts the clock (timekeeping circuit) of the timekeeping unit 19 in the GPS receiving apparatus 100. The CPU 11 obtains the distance by multiplying the time necessary for the radio wave emitted from the GPS satellite to reach the GPS receiving apparatus 100 by the speed of light (ranging). The CPU 11 executes ranging with at least three GPS satellites to calculate the position of the apparatus.

When the power is turned on the next time, the CPU 11 starts the reception operation with either one of the following modes: a first mode (hot start mode, warm start mode) in which the GPS receiving unit 15 receives the signal transmitted from the GPS satellite using the GPS information stored in the storage unit 16, or a second mode (cold start mode) in which the GPS receiving unit 15 receives the signal transmitted from the GPS satellite without using the GPS information stored in the storage unit 16.

After the power is turned on, before starting the reception operation, the CPU 11 judges whether the GPS receiving apparatus 100 is moved a predetermined distance or more from the previous measured position based on the information regarding the movement of the GPS receiving apparatus 100 (air pressure measurement data).

Specifically, the CPU 11 compares the air pressure measurement data stored in the air pressure measurement data storage unit 21 with the airplane air pressure change pattern stored in the storage unit 16, and when these data match, it is judged that the GPS receiving apparatus 100 is moved a predetermined distance or more from the previous measured position.

When the CPU 11 judges that the GPS receiving apparatus 100 is moved a predetermined distance or more from the previous measured position, the CPU 11 starts the reception operation with the cold start mode. In other words, the CPU 11 receives the signal transmitted from the GPS satellite with the GPS receiving unit 15 without using the GPS information stored in the storage unit 16.

When the CPU 11 judges that the distance that the GPS receiving apparatus 100 is moved from the previous measured position is less than a predetermined distance, and if the GPS information stored in the storage unit 16 is valid (i.e., is still within its term (period) of validity), the CPU 11 receives the signal transmitted from the GPS satellite with the GPS receiving unit 15 using the GPS information stored in the storage unit 16 (hot start mode, warm start mode). When the CPU 11 judges that the distance that the GPS receiving apparatus 100 has moved from the previous measured position is less than a predetermined distance, but the GPS information stored in the storage unit 16 is not valid (i.e., is outside of its term (period) of validity), the CPU 11 receives the signal transmitted from the GPS satellite with the GPS receiving unit 15 without using the GPS information stored in the storage unit 16 (cold start mode).

Next, the conditions to judge whether the apparatus is moving by way of an airplane is described. The CPU 11 judges whether the apparatus is moved a predetermined distance or more (long distance movement) by these conditions. For example, 5000 km is used as a predetermined distance.

As a result of analyzing actual measurements of changes of air pressure in an airplane, the following features (Feature A) to (Feature C) were found in a pressurized state during takeoff, landing, and cruising.

(Feature A) Feature of Air Pressure Change Pattern During Takeoff
air pressure change amount: about −13 hPa/min
takeoff time range: about 17 minutes
The air pressure change amount is the amount of change of air pressure for a unit of time. The takeoff time range is the time from when the airplane starts operation for takeoff to when the airplane starts cruising.

(Feature B) Feature of Air Pressure Change Pattern During Landing
air pressure change amount: about 15 hPa/min
landing time range: about 12 minutes
The landing time range is the time from when the airplane starts descent from the cruising state to when the airplane lands.

(Feature C) Feature of Air Pressure Change Pattern During Cruising
Air pressure variation: 790 hPa to 860 hPa (both inclusive)
Air pressure variation range: ±1% or less
The following Conditions (Condition X) to (Condition Z), used to judge whether movement of the device is by airplane, were formulated based on the above features (Feature A) to (Feature C). The storage unit 16 stores the conditions (Condition X) to (Condition Z) as the airplane air pressure change pattern in the storage unit 16.

(Condition X) Takeoff State Judging Condition
When the CPU 11 detects that the air pressure change amount is −20 hPa/min to −6 hPa/min (both inclusive) and is maintained continuously for 5 minutes, the CPU 11 judges that the state is a takeoff state. A variation of −13 hPa/min±50% is assumed for the air pressure change amount.

(Condition Y) Landing State Judging Condition
When the CPU 11 detects that the air pressure change amount is 8 hPa/min to 23 hPa/min (both inclusive) and is maintained continuously for 5 minutes, the CPU 11 judges that the state is a landing state. A variation of 15 hPa/min±50% is assumed for the air pressure change amount.

(Condition Z) Long Distance Movement Cruising Judging Condition
When the CPU 11 detects that the air pressure is 730 hPa to 890 hPa (both inclusive) and an air pressure variation range of ±2% or less is maintained continuously for 5.5 hours, the CPU 11 judges that the state is a long distance movement cruising state. The long distance movement cruising state is a state after the takeoff state and before the landing state. Since the air pressure variation is typically about 0.8 pressures (810 hPa) when pressurized, a variation of 810 hPa±10% is assumed. The amount of time that the state continues is decided assuming that the long distance movement is to be 5000 km or more, and the average speed of a jet airplane is 900 km/h.

When the CPU 11 detects (i) either the takeoff state of (Condition X) or the landing state of (Condition Y) or both the takeoff state of (Condition X) and the landing state of (Condition Y) and (ii) the long distance movement cruising state of (Condition Z), the CPU 11 judges that the apparatus is moved 5000 km or more by airplane.

Changes in the weather, such as typhoons, are also examples of when the air pressure changes. However, the air pressure change amount in a center of a typhoon is about 0.5 hPa/min, and is relatively small compared to the air pressure change amount in an air pressure change pattern of an airplane during takeoff and landing. Therefore, it is assumed that there is no error in judging the takeoff state and landing state using (Condition X) or (Condition Y).

Next, the operation in the GPS receiving apparatus 100 is described.

Figure 2:
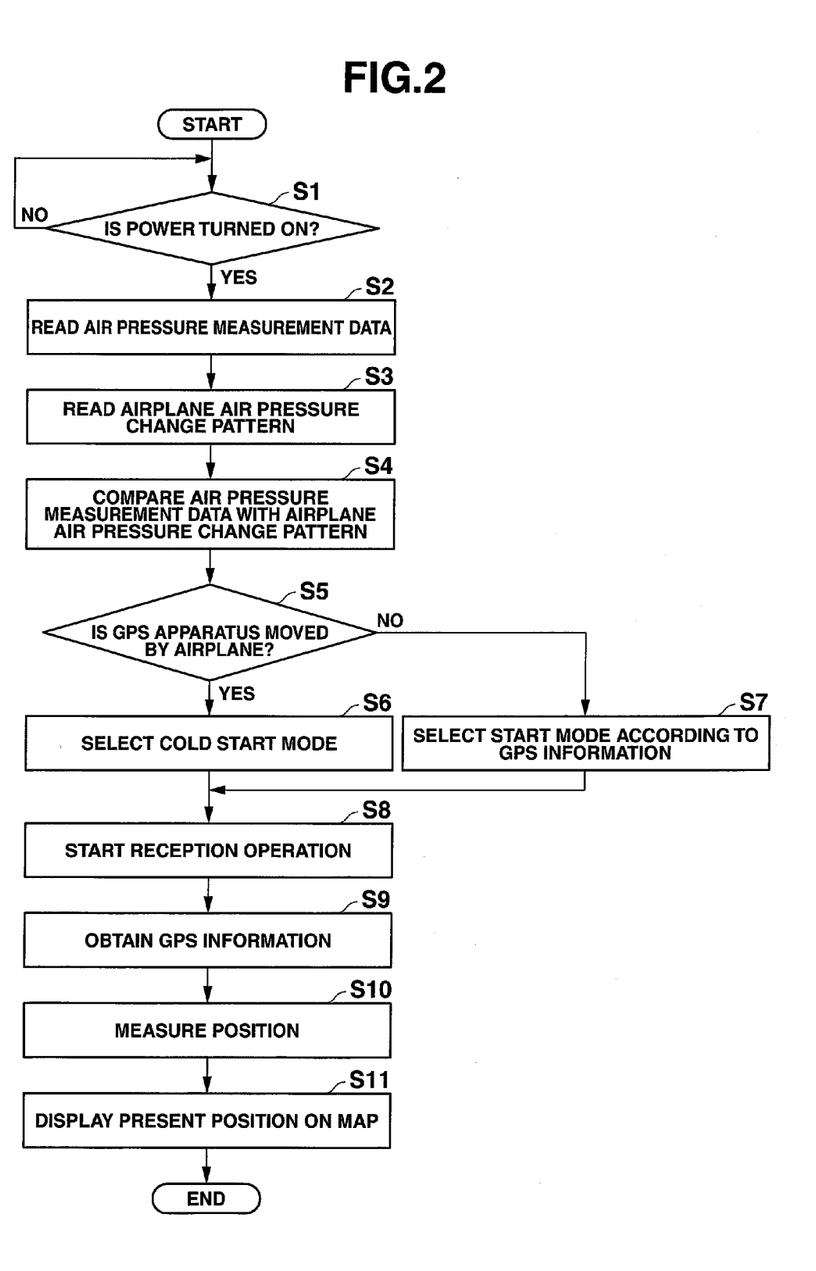
FIG. 2 is a flowchart showing a GPS reception processing executed by the GPS receiving apparatus.

FIG. 2 is a flowchart showing GPS reception processing executed in the GPS receiving apparatus 100. This processing is realized by software processing performed by the CPU 11 in coordination with the GPS reception processing program stored in the ROM 18. The GPS information (almanac data, ephemeris data) at the time shortly before the power is turned off is stored in the storage unit 16.

First, when the user presses the power source button of the operation unit 12 to instruct startup of the GPS receiving apparatus 100 (step S1; YES), the CPU 11 reads the air pressure measurement data stored in the air pressure measurement data storage unit 21 (step S2). The air pressure measurement data storage unit 21 stores air pressure measurement data for a predetermined term (for example, 10 hours, 1 day) before the present time. The CPU 11 stores the read pressure measurement data in the RAM 17.

Next, the CPU 11 reads the airplane air pressure change pattern stored in the storage unit 16 (step S3). Specifically, the CPU 11 reads the conditions (Condition X) to (Condition Z). The CPU 11 stores the read airplane pressure change pattern in the RAM 17.

Next, the CPU 11 compares the air pressure measurement data with the airplane air pressure change pattern and judges whether the air pressure measurement data matches with the airplane air pressure change pattern (step S4). This judgment corresponds to whether the apparatus is moved by airplane and whether the apparatus is moved a predetermined distance or more. Specifically, the CPU 11 judges whether there is a portion in the air pressure measurement data that satisfies (Condition X) to (Condition Z). When the CPU 11 detects (i) the takeoff state by (Condition X) and/or the landing state by (Condition Y) and (ii) the long distance movement cruising state by (Condition Z), in other words, when the air pressure measurement data matches with the airplane air pressure change pattern, the CPU 11 judges that the apparatus is moved 5000 km or more by airplane.

When it is judged that the air pressure measurement data matches with the airplane air pressure change pattern, in other words, it is judged that the apparatus is moved by airplane (movement of 5000 km or more) (step S5; YES), the CPU 11 selects the cold start mode (step S6).

When it is judged that the air pressure measurement data does not match with the airplane air pressure change pattern, in other words, it is judged that the apparatus is not moved by airplane (movement of 5000 km or more) (step S5; NO), similar to the conventional process, the CPU 11 selects the start mode according to the GPS information stored in the storage unit 16 (step S7). Specifically, the CPU 11 judges whether each of the almanac data and the ephemeris data included in the previous GPS information stored in the storage unit 16 is valid (i.e., within its term (period) of validity). When the almanac data and the ephemeris data are valid, the CPU 11 selects the hot start mode, when the almanac data is valid but the ephemeris data is not valid, the CPU 11 selects the warm start mode, and when both the almanac data and the ephemeris data are not valid, the CPU 11 selects the cold start mode.

After step S6 or step S7, the CPU 11 starts the reception operation based on the selected start mode (step S8). Specifically, when the cold start mode is selected, the CPU 11 receives the signal transmitted from the GPS satellite with the GPS receiving unit 15 without using the almanac data and the ephemeris data. When the hot start mode is selected, the CPU 11 receives the signal transmitted from the GPS satellite with the GPS receiving unit 15 using the almanac data and the ephemeris data. When the warm start mode is selected, the CPU 11 receives the signal transmitted from the GPS satellite with the GPS receiving unit 15 using only the almanac data.

According to the selected start mode, the CPU 11 receives the signal transmitted from the GPS satellite by controlling the GPS receiving unit 15 and obtains GPS information from the received signal (step S9). The CPU 11 stores the GPS information obtained by the GPS receiving unit 15 in the storage unit 16. The GPS information stored in the storage unit 16 is sequentially overwritten. However, the history can be stored according to necessity.

Next, based on the GPS information obtained by the GPS receiving unit 15, the CPU 11 measures the position of the GPS receiving apparatus 100 (step S10). The CPU 11 stores the measured position information obtained by measuring the position in association with the time information obtained from the timekeeping unit 19 in the storage unit 16.

Next, the CPU 11 reads the map information from the storage unit 16, and displays on the display unit 13 the map of the present position and its surroundings with the present position on the map according to the measured position information obtained by measuring the position (step S11).

With this, the GPS reception processing ends.

As described above, according to the GPS receiving apparatus 100 of the present embodiment, when it is judged that the apparatus is moved a predetermined distance or more from the previous measured position, the signal transmitted from the GPS satellite is received by the GPS receiving unit 15 without using the previous GPS information stored in the storage unit 16. In other words, the reception operation starts with the cold start mode from the beginning, and it is possible to prevent the above-described situation in which, as a result of starting with the hot start mode, the position measuring calculation does not end and the apparatus must therefore be restarted with the cold start mode. Therefore, it is possible to shorten the time necessary for measuring the position when the position is measured far from the previous measured position (with respect to the time necessary for measuring the position when starting with the hot start mode or the warm start mode in such a state).

Moreover, it is judged whether the GPS receiving apparatus 100 is moved by airplane by comparing the air pressure measurement data with the airplane air pressure change pattern. Therefore, it is possible to judge whether the GPS receiving apparatus 100 moved a predetermined distance or more from the previous measured position by a simple method.

The conditions (Condition X) to (Condition Z) used in the above embodiment for judging whether the apparatus is moved a predetermined distance or more are merely examples. The filtering conditions in averaging to remove variation values of the air pressure or air pressure variation noise can be suitably modified.

Moreover, all pieces of air pressure measurement data obtained in a predetermined term do not have to be stored. For example, it is possible to judge in real time whether the air pressure measurement data output from the air pressure sensor 20 satisfy the above described (Condition X), (Condition Y), and (Condition Z) to detect whether the state is takeoff, landing, or cruising, and the state can be associated with the time information and stored.

Next, Modification 1 of the above embodiment is described.

The GPS receiving apparatus in modification 1 has the same configuration as the GPS receiving apparatus 100 of the above embodiment. Therefore, FIG. 1 is referred here and illustration and description of the configuration are omitted. The characteristic configuration and processing of modification 1 are described below.

The CPU 11 as the takeoff/landing judging unit compares the air pressure measurement data measured by the air pressure sensor 20 with the takeoff/landing portion of the airplane air pressure change pattern stored in the storage unit 16 and when both of the above match, it is judged that the airplane is taking off/landing. The takeoff/landing portions of the airplane air pressure change pattern are the portions of the airplane air pressure change pattern which correspond to takeoff and landing of the airplane.

When it is judged that the airplane is taking off/landing, the CPU 11 as the power source control unit turns off the power (main power source unit 14) of the GPS receiving apparatus.

Figure 3:
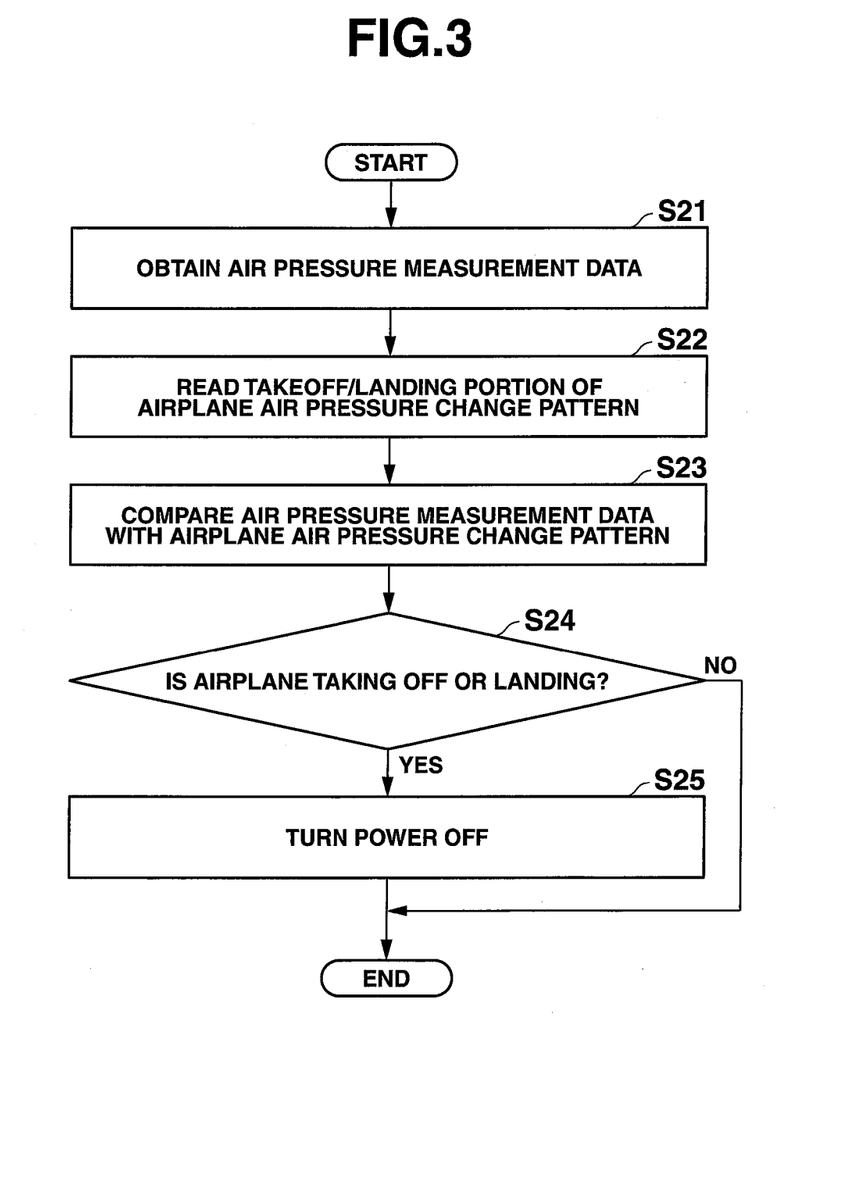
FIG. 3 is a flowchart showing a takeoff/landing judgment processing in modification 1.

Next, the operation of the GPS receiving apparatus of modification 1 is described.

FIG. 3 is a flowchart showing the takeoff/landing judgment processing executed in the GPS receiving apparatus of the modification 1. This processing is realized by software processing executed by the CPU 11 in coordination with the takeoff/landing judgment processing stored in the ROM 18.

First, the CPU 11 sequentially obtains the air pressure measurement data measured by the air pressure sensor 20 (step S21). The CPU 11 stores the obtained air pressure measurement data in the RAM 17.

Next, the CPU 11 reads the takeoff/landing portion of the airplane air pressure change pattern stored in the storage unit 16 (step S22). Specifically, the CPU 11 reads the conditions (Condition X) and (Condition Y). The CPU 11 stores the takeoff/landing portion of the read airplane pressure change pattern in the RAM 17.

Next, the CPU 11 compares the recent air pressure measurement data with the takeoff/landing portion of the airplane air pressure change pattern, and judges whether the recent air pressure measurement data matches with the takeoff/landing portion of the airplane air pressure change pattern (step S23). Specifically, the CPU 11 judges whether the recent air pressure measurement data satisfies the above-described (Condition X) or (Condition Y). When the recent air pressure measurement data satisfies (Condition X), the CPU 11 judges that the airplane is taking off. When the recent air pressure measurement data satisfies (Condition Y), the CPU 11 judges that the airplane is landing.

Here, when it is judged that the airplane is taking off or landing (step S24; YES), the power of the GPS receiving apparatus is turned off (step S25). In other words, the CPU 11 stops supply of electric power from the main power source unit 14 to each unit of the GPS receiving apparatus. With this, the power of the GPS receiving apparatus is in an off state.

After step S25 or in step S24, when it is judged that the airplane is not taking off or landing (step S24; NO), the takeoff/landing judgment processing ends.

According to modification 1, it is possible to judge that the airplane is taking off or landing based on the air pressure measurement data. Therefore, it is possible to force the GPS positioning to stop when the user erroneously starts the GPS receiving apparatus during takeoff or landing. As described above, it is possible to automatically turn off the power of the GPS receiving apparatus during takeoff or landing, at which time the use of the GPS receiving apparatus is prohibited.

Next, Modification 2 of the above embodiment is described.

Figure 4:
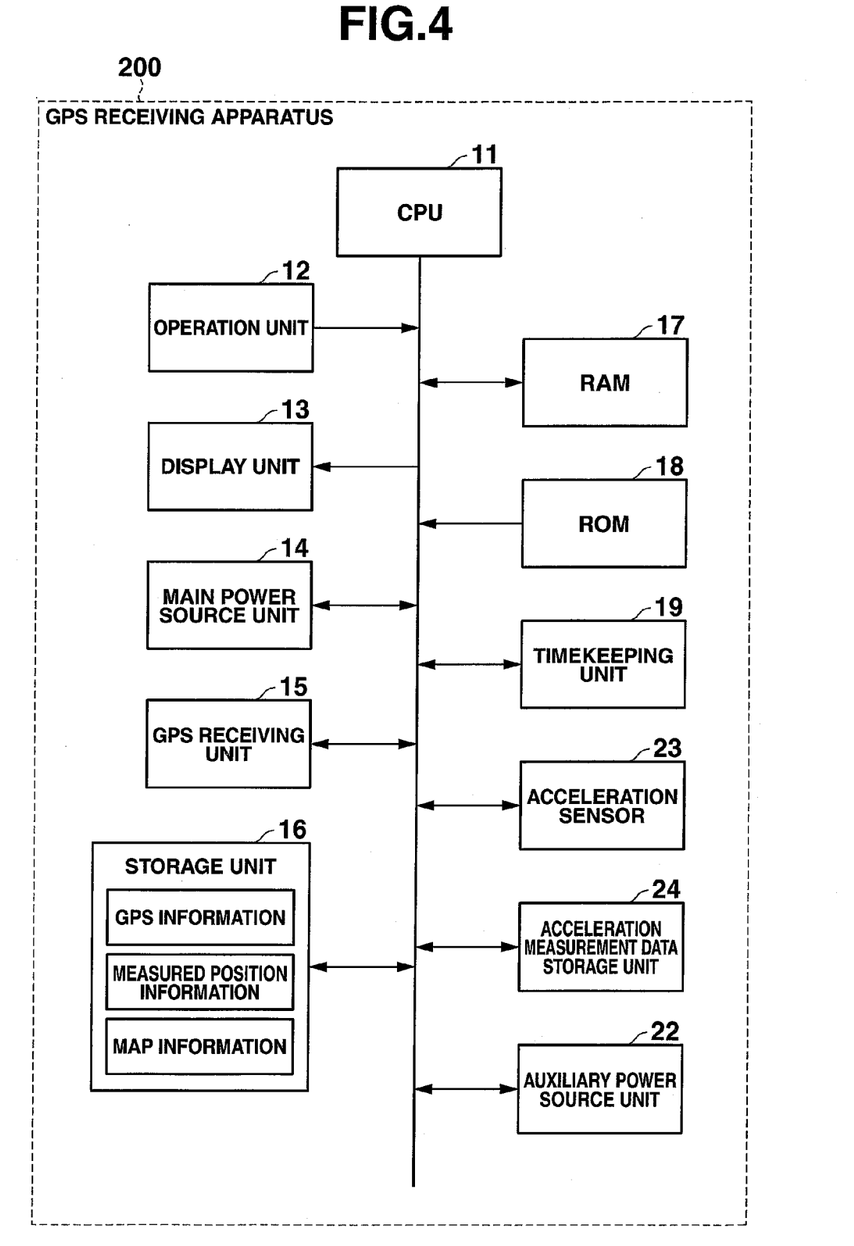
FIG. 4 is a block diagram showing a functional configuration of a GPS receiving apparatus of modification 2.

FIG. 4 is a block diagram showing a function configuration of the GPS receiving apparatus 200 in modification 2.

The GPS receiving apparatus 200 includes a CPU 11, an operation unit 12, a display unit 13, a main power source unit 14, a GPS receiving unit 15, a storage unit 16, a RAM 17, a ROM 18, a timekeeping unit 19, an acceleration sensor 23, an acceleration measurement data storage unit 24, and an auxiliary power source unit 22.

The configuration of the GPS receiving apparatus 200 is similar to the GPS receiving apparatus 100 shown in the above embodiment. Therefore, the description of the same portions is emitted. The characteristic configuration and processing of modification 2 are described below.

The acceleration sensor 23 measures the acceleration of the GPS receiving apparatus 200 at predetermined intervals and outputs the values of the measured acceleration.

The acceleration measurement data storage unit 24 includes a nonvolatile memory and stores time line data of the acceleration values measured by the acceleration sensor 23 (hereinafter referred to as the acceleration measurement data). The acceleration measurement data is data of the measured values of the acceleration output by the acceleration sensor, in association with the time information output from the timekeeping unit 19, when the acceleration is measured to record the value according to time.

The auxiliary power source unit 22 supplies electric power to the acceleration sensor 23 and the acceleration measurement data storage unit 24 when the power (main power source unit 14) of the GPS receiving apparatus 200 is turned off, in other words, when the electric power supply from the main power source unit 14 to each unit of the GPS receiving apparatus 200 stops.

When the power is turned on, before the reception operation, the CPU 11 as the movement judging unit judges whether the GPS receiving apparatus 200 is moved a predetermined distance or more (for example, 5000 km) from the previous measured position based on the information (acceleration measurement data) regarding the movement of the GPS receiving apparatus 200.

Specifically, based on the acceleration measurement data stored in the acceleration measurement data storage unit 24, the CPU 11 calculates the distance that the apparatus (GPS receiving apparatus 200) is moved from the previous measured position, and when the calculated distance is the predetermined distance or more, it is judged that the apparatus is moved the predetermined distance or more from the previous measured position.

Figure 5:
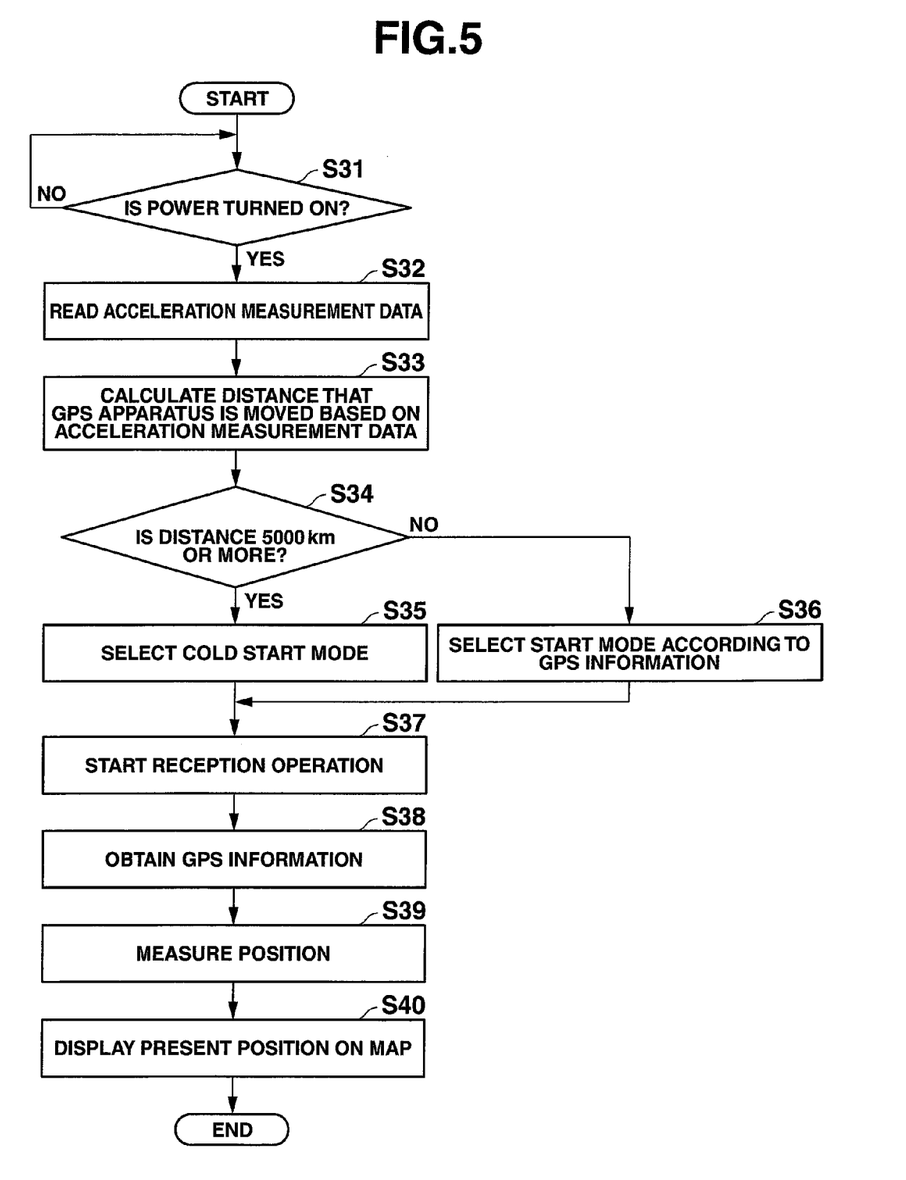
FIG. 5 is a flowchart showing GPS reception processing in modification 2.

Next, the operation of the GPS receiving apparatus 200 of modification 2 is described.

FIG. 5 is a flowchart showing the GPS reception processing executed by the GPS receiving apparatus 200. This processing is realized by software processing executed by the CPU 11 in coordination with the GPS reception processing program stored in the ROM 18.

First, when the user presses the power source button of the operation unit 12 to instruct startup of the GPS receiving apparatus 200 (step S31; YES), the CPU 11 reads the acceleration measurement data stored in the acceleration measurement data storage unit 24 (step S32). The CPU 11 stores the read acceleration measurement data in the RAM 17.

Next, based on the read acceleration measurement data, the CPU 11 integrates the acceleration over time to calculate the speed, and integrates the speed over time to calculate the distance that the GPS receiving apparatus 200 is moved from the previous measured position (step S33).

Next, the CPU 11 judges whether the calculated distance is 5000 km or more (step S34). When the distance is 5000 km or more (step S34; YES), the CPU 11 selects the cold start mode (step S35).

In step S34, when the distance is less than 5000 km (step S34; NO), similar to the conventional process, the CPU 11 selects the start mode according to the GPS information stored in the storage unit 16 (step S36).

After step S35 or step S36, the processing advances to step S37.

The processing of step S37 to step S40 is similar to processing of step S8 to step S11 in the above embodiment, and therefore the description is omitted.

According to modification 2, when it is judged that the apparatus is moved a predetermined distance or more from the previous measured position based on the acceleration measurement data, the signal transmitted from the GPS satellite is received with the GPS receiving unit 15 without using the previous GPS information stored in the storage unit 16. In other words, since the reception operation is started with the cold start mode from the beginning, it is possible to reduce the time required for measuring the position when the position is measured far from the previous measured position (with respect to the time which would be required to measure the position when starting with the hot start mode or the warm start mode).

Moreover, the distance that the GPS receiving apparatus 200 is moved from the previous measured position can be calculated based on acceleration measurement data. Therefore, it is possible to judge whether the GPS receiving apparatus 200 is moved a predetermined distance or more by a simple method.

Next, Modification 3 of the above described embodiment is described.

The configuration of the GPS receiving apparatus in modification 3 is similar to that of the GPS receiving apparatus 100 of the above embodiment. Therefore, FIG. 1 is referred to and the illustration and the description of the configuration is limited. In modification 3, the air pressure sensor 20 and the air pressure measurement data storage unit 21 are not necessary and the airplane air pressure change pattern stored in the storage unit 16 is also not necessary. The characteristic configuration and processing of modification 3 are described below.

Airport position information (latitude, longitude, altitude) showing the position of each airport on the earth is stored in advance in the storage unit 16.

When the power is turned on, before the reception operation starts, the CPU 11 as the movement judging unit judges whether the GPS receiving apparatus is moved a predetermined distance or more from the previous measured position based on the information regarding the movement of the GPS receiving apparatus of modification 3 (information showing the previous measured position).

Specifically, based on the information showing the previous measured position (measured position information stored in the storage unit 16), the CPU 11 judges whether the previous measured position is a predetermined position, and when the previous measured position is a predetermined position, it is judged that the apparatus (GPS receiving apparatus of modification 3) is moved a predetermined distance or more from the previous measured position. Here, the CPU 11 judges whether the previous measured position information matches with the airport position information stored in the storage unit 16, in other words, whether the previous measured position is an airport.

When the previous measured position is an airport, it is assumed that the user holding the GPS receiving apparatus got on an airplane. Therefore, when it is judged that the previous measured position is an airport, the CPU 11 judges that the apparatus is moved a predetermined distance or more from the previous measured position.

Figure 6:
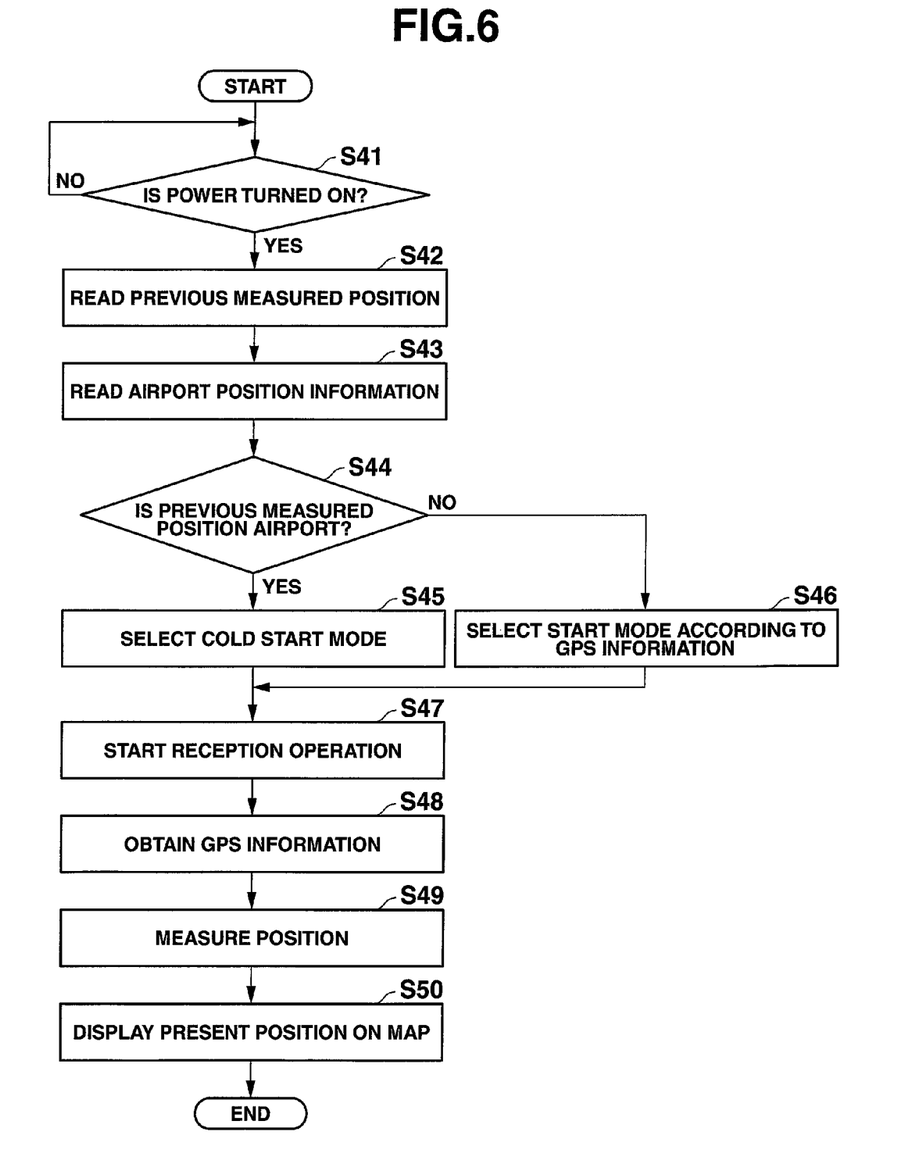
FIG. 6 is a flowchart showing GPS reception processing in modification 3.

Next, the operation of the GPS receiving apparatus of modification 3 is described.

FIG. 6 is a flowchart showing the GPS reception processing executed by the GPS receiving apparatus of modification 3. This processing is realized by software processing executed by the CPU 11 in coordination with the GPS reception processing program stored in the ROM 18.

First, when the user presses the power source button of the operation unit 12 and instructs the start of the GPS receiving apparatus (step S41; YES), the CPU 11 reads the previous measured position information stored in the storage unit 16 (step S42). The CPU 11 stores the read previous measured position information in the RAM 17.

Next, the CPU 11 reads the airport position information from the storage unit 16 (step S43). The CPU 11 stores the read airport position information in the RAM 17.

Next, based on the previous measured position information and the airport position information, the CPU 11 judges whether the previous measured position is an airport (step S44). For example, when the longitude, the latitude, and the altitude included in the previous measured position information matches with the longitude, the latitude, and the altitude included in the airport position information (including when the difference between the two are within a predetermined range), the CPU 11 judges that the previous measured position is an airport. When it is judged that the previous measured position is an airport (step S44; YES), in other words, when it is judged that the apparatus is moved a predetermined distance or more from the previous measured position, the CPU 11 selects the cold start mode (step S45).

In step S44, when it is judged that the previous measured position is not an airport (step S44; NO), in other words, when it is judged that the distance that the apparatus is moved from the previous measured position is less than a predetermined distance, similar to the conventional process, the CPU 11 selects the start mode according to the GPS information stored in the storage unit 16 (step S46).

After step S45 or step S46, the processing advances to step S47.

The processing of step S47 to step S50 is similar to the processing of step S8 to step S11 in the above embodiment, and therefore the description is omitted.

According to modification 3, when it is judged that the apparatus is moved a predetermined distance or more from the previous measured position based on where the previous measured position is, the signal transmitted from the GPS satellite is received by the GPS receiving unit 15 without using the previous GPS information stored in the storage unit 16. In other words, since the reception operation starts with the cold start mode, it is possible to reduce the time required to measure the position when the position is measured far from the previous measured position (with respect to the time required to measure the position when starting with the hot start mode or the warm start mode in such a state).

Moreover, it is judged whether the GPS receiving apparatus is moved a predetermined distance or more from the previous measured position based on where the previous measured position is. Therefore, it is possible to judge whether the GPS receiving apparatus is moved a predetermined distance or more by a simple method.

The description of the above described embodiment and modifications 1 to 3 are examples of the GPS receiving apparatus of the present invention, and the present invention is not limited to the above. The detailed configuration and detailed operation of each unit of the apparatus can be suitably modified without leaving the scope of the present invention.

For example, the method of judging whether the apparatus is moved a predetermined distance or more from the previous measured position is not limited to the methods described above. For example, it is possible to obtain an inclination using a geomagnetic field sensor, and it is possible to judge whether the apparatus is moved a predetermined distance or more from the previous measured position by using the change of the inclination. However, since it is necessary to judge whether the apparatus is moved a predetermined distance or more before measuring the present position, methods which use the GPS information of the present information are omitted.

In the present embodiment and modification 2, 5000 km is used as an example of a "predetermined distance" to judge whether the apparatus is moved a long distance, however, this value can be suitably changed.

In the above description, a ROM is disclosed as the computer readable medium storing the program to execute the processing, however, the present invention is not limited to the above example. As the computer readable medium, it is possible to employ a nonvolatile memory such as a flash memory, or a portable recording medium such as a CD-ROM. As a medium to provide the data of the program through communication lines, a carrier wave can be used.

Although various exemplary embodiments have been shown and described, the invention is not limited to the embodiments shown. Therefore, the scope of the invention is intended to be limited solely by the scope of the claims that follow and its equivalents.

What is claimed is:
1. A GPS receiving apparatus comprising:
    a GPS receiver which receives a GPS signal and obtains GPS information from the received signal;
    a first storage which stores the GPS information obtained by the GPS receiver; and
    a processor which is configured to:
        measure a first position and a second position based on the GPS information obtained by the GPS receiver, wherein the first position is measured at a time prior to a time at which the second position is measured;
        start a reception operation with either a first mode or a second mode, wherein the first mode is a mode in which the GPS signal is received by the GPS receiver using the GPS information stored in the first storage, and the second mode is a mode in which the GPS signal is received without using the GPS information stored in the first storage;
        judge, based on information retrieved independently of the GPS information, whether the GPS receiving apparatus has moved a predetermined distance or more from the first position, and
        judge whether or not the GPS information is within a period of validity;
    wherein the reception operation starts with the second mode without judging whether or not GPS information is within the period of validity in a case in which it is judged that the GPS receiving apparatus has moved the predetermined distance or more from the first position,
    wherein the reception operation starts with the first mode in a case in which (i) it is judged that the GPS receiving apparatus has not moved the predetermined distance or more from the first position and (ii) it is judged that the GPS information is within the period of validity, and
    wherein the reception operation starts with the second mode in a case in which (i) it is judged that the GPS receiving apparatus has not moved the predetermined distance or more from the first position and (ii) it is judged that the GPS information is not within the period of validity.

2. The GPS receiving apparatus according to claim 1, wherein when the GPS receiving apparatus is turned on, the processor judges whether the GPS receiving apparatus has moved the predetermined distance or more from the first position.

3. The GPS receiving apparatus according to claim 1, further comprising:
    an air pressure sensor which measures air pressure; and
    a second storage which stores data of air pressure measured by the air pressure sensor over a period of time as timeline data of the air pressure;
    wherein the first storage further stores a predetermined air pressure change pattern showing a change in air pressure when moving in an airplane, and
    wherein when judging whether the GPS apparatus has moved the predetermined distance or more from the first position, the processor makes a comparison between (i) the timeline data of the air pressure stored in the second storage and (ii) the predetermined air pressure change pattern stored in the first storage, and when the processor determines that the timeline data of the air pressure and the predetermined air pressure change pattern match, the processor judges that the GPS apparatus has moved the predetermined distance or more from the first position.

4. The GPS receiving apparatus according to claim 3, wherein the processor is further configured to:
    make a comparison between (i) the timeline data of the air pressure and (ii) a takeoff/landing portion of the predetermined air pressure change pattern, and when the processor determines that the timeline data of the air pressure and the takeoff/landing portion of the predetermined air pressure change pattern match, the processor judges that the airplane is taking off or landing; and
    turn off power to the GPS receiving apparatus when the processor judges that the airplane is taking off or landing.

5. The GPS receiving apparatus according to claim 1, further comprising:
    an acceleration sensor which measures acceleration; and
    a second storage which stores data of acceleration measured by the acceleration sensor over a period of time as timeline data of the acceleration,
    wherein when judging whether the GPS apparatus has moved the predetermined distance or more from the first position, the processor calculates a distance that the GPS receiving apparatus has moved from the first position based on the timeline data of the acceleration stored in the second storage, and when the calculated distance is the predetermined distance or more, the processor judges that the GPS receiving apparatus has moved the predetermined distance or more from the first position.

6. The GPS receiving apparatus according to claim 1, further comprising a display which displays a GPS reception status or a present position on a map.

7. A non-transitory computer-readable storage medium having a program stored thereon for controlling a processor of a GPS receiving apparatus, the GPS receiving apparatus further including a GPS receiver which receives a GPS signal and obtains GPS information from the received signal, and a first storage in which the GPS information obtained by the GPS receiver is stored, wherein the program is executable to control the processor to:

measure a first position and a second position based on the GPS information obtained by the GPS receiver, wherein the first position is measured at a time prior to a time at which the second position is measured;

start a reception operation with either a first mode or a second mode, wherein the first mode is a mode in which the GPS signal is received by the GPS receiver using the GPS information stored in the first storage, and the second mode is a mode in which the GPS signal is received without using the GPS information stored in the first storage;

judge, based on information retrieved independently of the GPS information, whether the GPS receiving apparatus has moved a predetermined distance or more from the first position; and judge whether or not the GPS information is within a period of validity, wherein the reception operation starts with the second mode without judging whether or not GPS information is within the period of validity in a case in which it is judged that the GPS receiving apparatus has moved the predetermined distance or more from the first position, wherein the reception operation starts with the first mode in a case in which (i) it is judged that the GPS receiving apparatus has not moved the predetermined distance or more from the first position and (ii) it is judged that the GPS information is within the period of validity, and wherein the reception operation starts with the second mode in a case in which (i) it is judged that the GPS receiving apparatus has not moved the predetermined distance or more from the first position and (ii) it is judged that the GPS information is not within the period of validity.

8. A GPS receiving method of a GPS receiving apparatus, the GPS receiving apparatus including a GPS receiver which receives a GPS signal and obtains GPS information from the received signal, and a first storage in which the GPS information obtained by the GPS receiver is stored, the method comprising:

measuring a first position and a second position based on the GPS information obtained by the GPS receiver, wherein the first position is measured at a time prior to a time at which the second position is measured;

starting a reception operation with either a first mode or a second mode, wherein the first mode is a mode in which the GPS signal is received by the GPS receiver using the GPS information stored in the first storage, and the second mode is a mode in which the GPS signal is received without using the GPS information stored in the first storage;

judging, based on information retrieved independently of the GPS information, whether the GPS receiving apparatus has moved a predetermined distance or more from the first position; and judging whether or not the GPS information is within a period of validity, wherein the reception operation starts with the second mode without judging whether or not GPS information is within the period of validity in a case in which it is judged that the GPS receiving apparatus has moved the predetermined distance or more from the first position, wherein the reception operation starts with the first mode in a case in which (i) it is judged that the GPS receiving apparatus has not moved the predetermined distance or more from the first position and (ii) it is judged that the GPS information is within the period of validity, and wherein the reception operation starts with the second mode in a case in which (i) it is judged that the GPS receiving apparatus has not moved the predetermined distance or more from the first position and (ii) it is judged that the GPS information is not within the period of validity.

* * * * *